United States Patent [19]

Sodal et al.

[11] 4,018,241

[45] Apr. 19, 1977

[54] METHOD AND INLET CONTROL SYSTEM FOR CONTROLLING A GAS FLOW SAMPLE TO AN EVACUATED CHAMBER

[75] Inventors: Ingvar E. Sodal; Lars Hoivik, both of Boulder; Alexander J. Micco; John V. Weil, both of Denver; Norman W. Baer, Boulder, all of Colo.

[73] Assignee: The Regents of the University of Colorado, Boulder, Colo.

[22] Filed: Oct. 3, 1975

[21] Appl. No.: 619,441

Related U.S. Application Data

[62] Division of Ser. No. 508,452, Sept. 23, 1974, Pat. No. 3,926,209, which is a division of Ser. No. 355,792, April 30, 1973, Pat. No. 3,895,231.

[52] U.S. Cl. .............................. 137/14; 137/487.5; 250/282; 250/288; 250/289; 250/457; 251/368

[51] Int. Cl.[2] .......................................... F16K 31/02

[58] Field of Search ..................... 137/487.5, 14, 2; 128/2.07; 73/421.5 R; 250/288, 289, 282, 457; 251/368

[56] References Cited

UNITED STATES PATENTS

| | | | |
|---|---|---|---|
| 3,586,027 | 6/1971 | Fitzgerald | 137/487.5 X |
| 3,661,528 | 5/1972 | Falk | 128/2.07 |
| 3,662,605 | 5/1972 | Grotyohann | 73/421.5 R |
| 3,834,375 | 9/1974 | Sanctuary | 128/2.07 |

*Primary Examiner*—Alan Cohan

[57] ABSTRACT

A method and inlet control system for controlling a gas flow sample to an evacuated chamber such as found in a mass spectrometer, is disclosed. The system utilizes a short inlet passage having an effective opening determined by a tapered diamond or steel tip needle adjacent to the inlet passage. The needle is positionally adjusted with respect to the inlet passage by being mounted on a piezoelectric crystal which is flexed by coupling thereto an electric potential derived by sensing the ions at the ionization chamber of a mass spectrometer, for example, and developing therefrom an electric signal indicative of the total pressure within the ionization chamber. The signal coupled to the piezoelectric crystal is preferably a pulse-width modulated signal with the needle maintaining the inlet passage closed except during the time that the piezoelectric crystal is flexed due to a received pulse. A vacuum pump, and a quadrupole filter, both of which are relatively small, are also disclosed, so that a mass spectrometer system, for example, is sufficiently compact so as to be useful, in conjunction with a respiratory valve, for the analysis of respiratory gases. The method for controlling a gas sample flow to a mass spectrometer, for example, comprises providing an inlet for a gas sample into the ionization chamber of the mass spectrometer, monitoring the pressure within the ionization chamber and developing an electrical signal indicative thereof, and utilizing the developed electrical signal to control the flow of gas sample through the inlet to maintain a substantially constant pressure within the ionization chamber.

8 Claims, 4 Drawing Figures

METHOD AND INLET CONTROL SYSTEM FOR CONTROLLING A GAS FLOW SAMPLE TO AN EVACUATED CHAMBER

This is a division of application Ser. No. 508,452, filed Sept. 23, 1974, now U.S. Pat. No. 3,926,209, issued Dec. 16, 1975, which is a division of Ser. No. 355,792, filed Apr. 30, 1973, issued as U.S. Pat. No. 3,895,231, issued July 15, 1975.

FIELD OF THE INVENTION

This invention relates to a method and inlet control system for controlling a gas flow sample to an evacuated chamber including such evacuated chambers as are found in a mass spectrometer and a sputtering system.

BACKGROUND OF THE INVENTION

Much of pulmonary physiology is based on the analysis of respiratory gases. Because of its potential as a high speed accurate gas analyzer, the mass spectrometer has attracted considerable attention in this field. However, the instrument has failed to reach its potential at least in part due to the necessity for a long capillary inlet system which can, and often does, destroy the integrity of the gas sample and causes instability in the instrument.

Thus, while mass spectrometers have been available to respiratory physiologists for about 20 years, they have not achieved the widespread application that was once predicted. With respect to the technical shortcomings in spectrometer design at least for pulmonary physiology purposes, the sample inlet system is one of the major problems.

Inherent with mass spectrometry as well as with a sputtering system is that an immense pressure difference exists between the site at which gas is sampled and the inside of the spectrometer. Traditionally this pressure drop is achieved in two stages. Firstly, a long slender sampling capillary tube is used which produces the major fall in pressure. Secondly, at the end of the capillary a fixed molecular leak is employed to achieve the final pressure drop.

The capillary is required because the size of known spectrometers does not permit them to be brought into close proximity to the source of sample gas such as a respiratory valve. (See Fowler, K. T., "The Respiratory Mass Spectrometer," PHYSICS IN MEDICINE AND BIOLOGY, Volume 14, pages 185–199, 1969.) This arrangement has several adverse effects on instrument performance. Firstly, there are distortions introduced by the behavior of water vapor. During the respiratory cycle sample gas swings between dry inspired and wet expired gas. Water vapor traverses a heated sampling capillary about 10 times more slowly than the other respiratory gases. Hence, the ionizer sees a fluctuating water vapor level which does not reflect the pressure of water vapor at the front end of the capillary. Unpredictable errors in precision occur because the dilution effect due to water vapor is not the same as existed at the mouth. At an oxygen tension of 100 mm Hg this error could be as great as 8% if no correction is applied. Various methods for correction of this problem have been employed, but only to obtain a more accurate relationship between the gases of greatest interest. (See Scheid, P., Slama, H., and Piiper, J., "Electronic Compensation of the Effects of Water Vapor in Respiratory Mass Spectrometry," J. APPL. PHYSIOL., Volume 30, pages 258–260, 1971). Secondly, the sampling capillary introduces delay in response and deterioration of rise time of the instrument. Although this could theoretically be measured and corrected for, small variations in pumping speed cause relatively large changes in transit time such that in practice it is difficult to achieve this correction accurately. This creates problems when data concerning gas concentration are to be combined with other information such as gas flow rates as in the measurement of oxygen uptake. Lastly, even though the geometry of the sample conduit and inlet are fixed the actual rate of molecular flow into the spectrometer tends to vary from moment to moment because factors such as particle deposition and changes in gas composition alter the conductance of the inlet system.

Since the mass spectrometer is a particle counting device variations in molecular leak rate due to the above factors constitute a source of random error. Hence, it is apparent that the way by which the gas sample is introduced into the ionizer is the most critical step in the measurement of respiratory gases by a mass spectrometer. A more accurate measurement of the sample line would be made short and the volume of the conduits in front of the ionizer and the ionization chamber made smaller.

SUMMARY OF THE INVENTION

This invention provides an evacuated chamber, such as is found in a mass spectrometer system, that does not require a lengthy capillary inlet tube. The inlet system of this invention includes valve means adjacent to a small orifice providing an inlet passage into the evacuated chamber of, for example, a mass spectrometer, with the valve means being positionally controlled by valve position control means that may be made responsive to an electrical signal derived by monitoring the pressure within the evacuated chamber. By utilizing the foregoing, system stability is improved and accurate measurement of all respiratory gases, including water vapor, is facilitated. In addition, by reducing component size, the overall system is made sufficiently compact so as to be particularly useful for direct attachment to a respiratory valve.

It is therefore an object of this invention to provide a new and novel method and inlet control system for controlling a gas flow sample to an evacuated chamber.

It is another object of this invention to provide an improved mass spectrometer system that is compact yet provides good stability and accurate measurements.

It is another object of this invention to provide an improved mass spectrometer having a new and novel inlet system.

It is still another object of this invention to provide an inlet system for an evacuated chamber that does not require a lengthy capillary inlet tube.

It is yet another object of this invention to provide an inlet system for an evacuated chamber, including that used in a mass spectrometer, that includes a valve means and valve position control means.

It is another object of this invention to provide a servo-controlled inlet system for an evacuated chamber that automatically maintains the total pressure within said chamber at a predetermined level.

It is yet another object of this invention to provide a unique method for controlling sample gas flow to a mass spectrometer.

It is still another object of this invention to provide an inlet control system for a mass spectrometer that has a low flow capability without adversely affecting good system stability.

With these and other objects in view, which will become apparent to one skilled in the art as the description proceeds, the invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE PREFERRED EMBODIMENT

Figure 1:
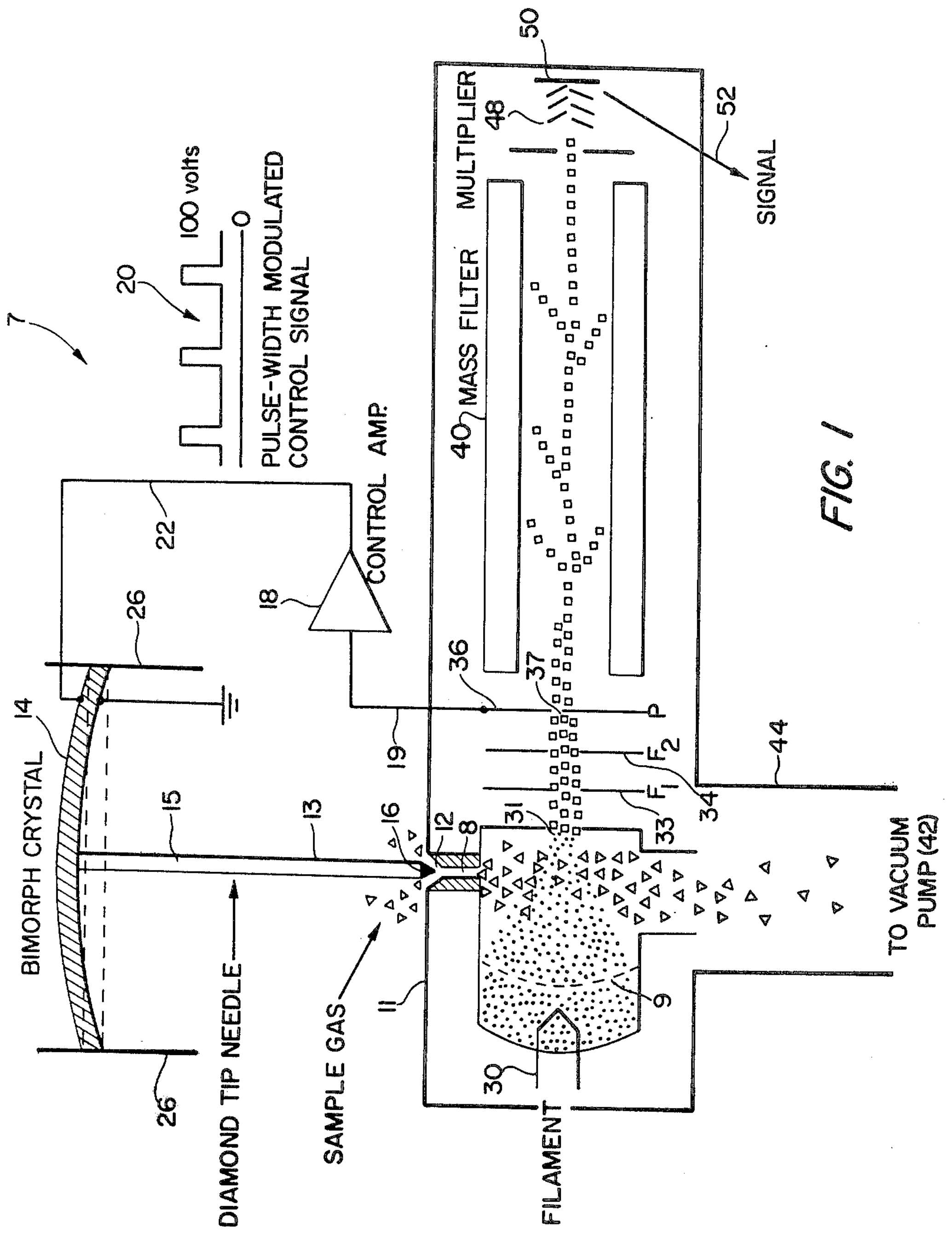
FIG. 1 is a simplified schematic representation of the mass spectrometer system of this invention including a servo-controlled inlet system.
Figure 2:
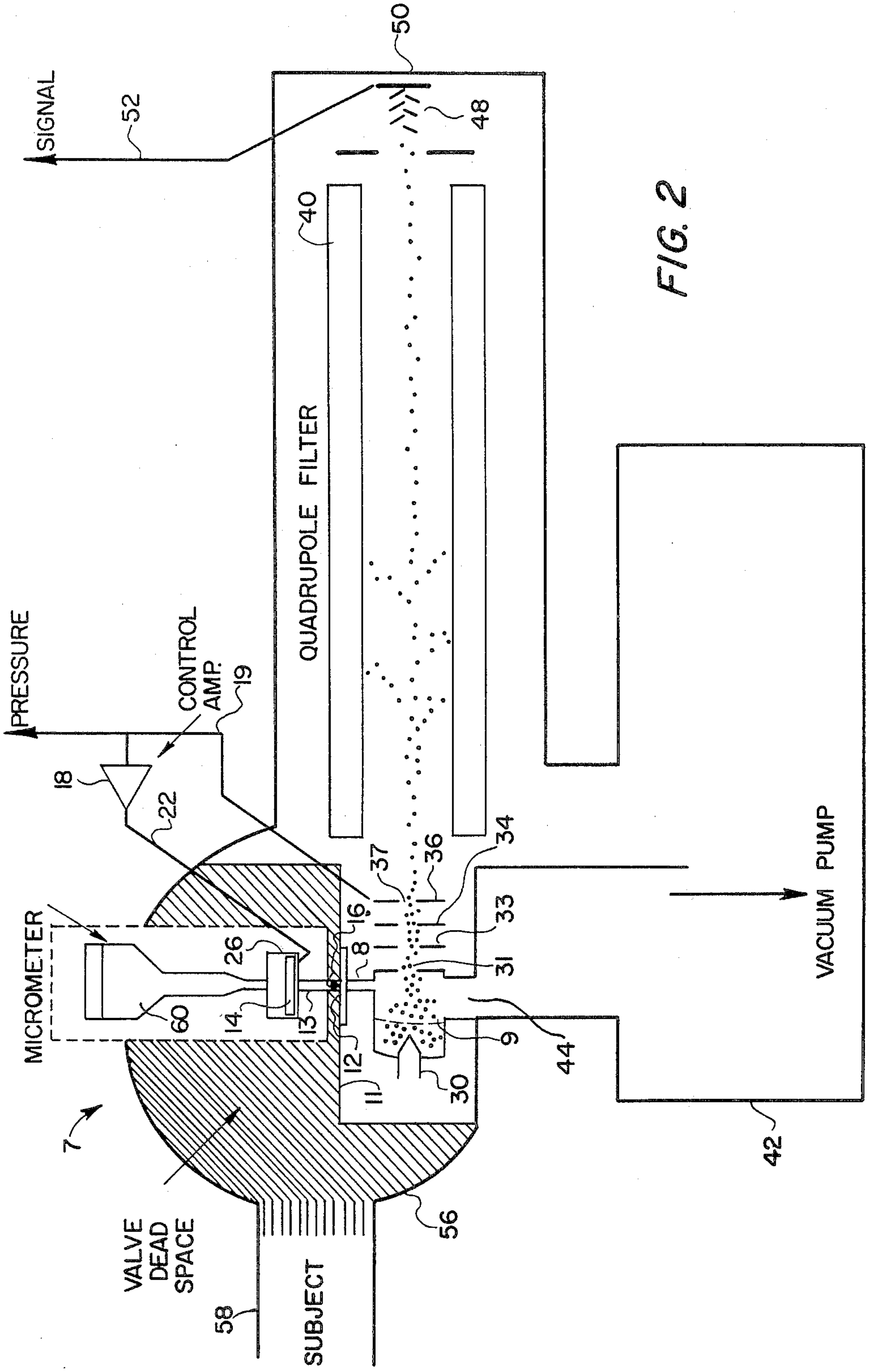
FIG. 2 is a simplified schematic representation of a mass spectrometer as shown in FIG. 1 but showing the system attached to a respiratory valve.

Referring now to the drawings in which like numerals have been used for like characters, the numeral 7 refers generally to the mass spectrometer of this invention. As shown in FIGS. 1 and 2, the mass spectrometer system includes an inlet passage 8 through which sample gas is introduced into ionization chamber 9. The inlet passage 8 is formed in the top portion of the spectrometer housing 11, which housing may be formed by a thin stainless steel membrane (6 mills) with a small (2 mills) 12 which can be occluded to a varying degree by a diamond-tipped or steel-tipped needle 13. The needle is mounted on a piezoelectric crystal 14 (at the end of body portions 15 of needle 13 opposite the tapered diamond or steel tip 16), which crystal has the property of flexing when an electric potential is applied to it (described more fully, for example, in Berlincourt, D. A., "Piezoelectric Transducers," ELECTRO-TECHNOLOGY, pages 33–44, January, 1970). The movement of the needle and hence the leak rate is a function of the voltage applied to the crystal.

A signal proportional to the total pressure in the ionized (as brought out more fully hereinafter) provides the input to a control amplifier, or signal processing means, 18 through lead 19 to drive the crystal, permitting a servo-controlled movement of the needle so as to maintain ionizer pressure constant. This servosystem controlling the leak (i.e., introduction of sample gas into the ionization chamber of the mass spectrometer) has an extremely rapid response time ($\tau < 2$ msec) and it is capable of operating the leak to compensate for the fastest changes in gas composition, water vapor effects, etc., which in existing systems change the ionization pressure and thereby introduce errors in the signal output from the mass spectrometer. As shown schematically (at 20) in FIG. 1, a pulse-width modulated, pressure-controlled signal coupled to the crystal from control amplifier 18 through lead 22 provides a low flow inlet, but at the same time permits a large inlet orifice preventing clogging of the lead and separation of gases. With the short distance between the leak and the ionizer both the delay time and the response time are greatly reduced compared to that of a capillary inlet system. Positioning the crystal (which crystal is conventionally maintained in position in mount 26, for example) such that when no voltage is applied, the mechanical stress on the crystal is sufficient to close the leak, as indicated in the dotted lines of FIG. 1. Hence, the leak will close automatically if the instrument is in a standby mode, or more important, the leak will always be closed if power is removed. This essentially means that the mass spectrometer system is fail safe, and that it can be moved from one location to another without first going through a complex shut-down procedure. If a high quality vacuum system is employed, it is conceivable that the system could maintain its vacuum over several days without pumping or any form of power input. In a working embodiment of this invention, the leak has been tested in a closed position with a helium leak detector and no measurable leakage was detected. This test was conducted after the leak had been in continuous operation for three weeks in a laboratory atmosphere and occasionally exposed to expired respiratory gas during this period. The same leak was also tested for its mechanical stability. After being dropped from several inches down to a table top, the leak was unchanged.

In order to decrease instrument response time without increasing pumping requirements, a new smaller and more efficient ionizer is utilized in this invention. The ionizer has built-in pressure measuring capability which is used to control the leak rate and for calculation of gas tensions. This is achieved by using a small ionization chamber 9 of less than 2 cc total volume (see FIG. 1), which conducts a high flow rate of sample gas directly from the leak, thus providing a fast response time for the system. A conventional filament 30 is utilized (electrical connection are not shown for simplicity) in the ionization chamber. The ion beam is emitted from the chamber through aperture 31. Two plates 33 and 34 provide electrostatic focusing of the ion beam and a third plate 36 with a smaller orifice 37 picks off part of the ion beam and supplies the signal to electrometer 18 for pressure monitoring. The main advantage in this unique way of measuring ionizer pressure is that it gives an instant and accurate representation of ionizer pressure as well as measuring the ion beam which actually enters the mass filter 40 thus using the signal which most directly affects the output of the mass spectrometer as a control signal for the leak.

As shown in FIGS. 1 and 2, the sample gas passing through passage 8 is introduced into ionization chamber 9, and a vacuum pump 42 also is connected with the ionization chamber, as is common for mass spectrometers, through passage 44. After the ion beam is emitted from ionization chamber 9, focused by plates 33 and 34, and a portion picked off by plate 36, the beam is directed to a mass filter 40, which as indicated in FIG. 2, can be conventional quadrupole filter (such filters are discussed, for example, in Pedan, J., "The Quadrupole Approach," INDUSTRIAL RESEARCH, pages 50–52, April, 1970; and Wiesendanger, H.U.D., "Quadrupole Mass Spectrometry," AMERICAN LABORATORY, pages 35–43, July, 1970). At the outlet of the mass filter, the beam is conventionally directed through multiplier 48 to plate 50 where the outlet signal is developed and coupled from the system through lead 52. As indicated in FIG. 2, this signal, along with a signal from plate 36 on lead 19, may be coupled to a computer (not shown) for conventional processing.

Figure 3:
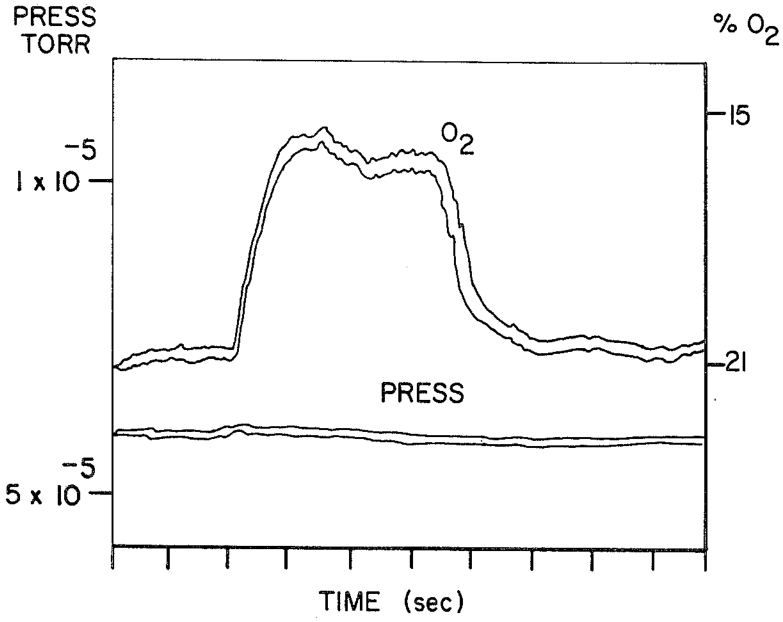
FIG. 3 is an illustration of a typical cycle during normal operation of the system of this invention.
Figure 4:
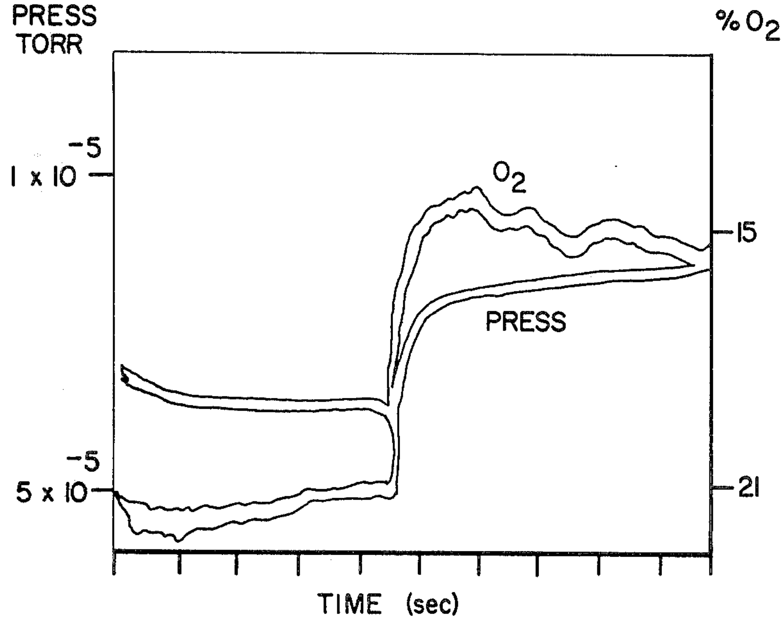
FIG. 4 is an illustration of a typical cycle when the inlet system of this invention is not utilized.

As shown in FIG. 2, a respiratory valve 56 can be provided. The passage 8 preferably communicates with the middle chamber of such a valve so that both inspiratory and expiratory gas can be sampled by the mass spectrometer. As shown in FIG. 2, the gas from a subject is introduced into the respiratory valve through tube 58, and a micrometer 60 may also be provided. The system of this invention has been built and tested with a quadrupole filter. FIG. 3 shows the output of the instrument when tuned to measure oxygen during an expiratory breathing cycle by blowing across the leak assembly such that a large amount of water vapor and particles in the expired air were deposited on the leak. No special mouth piece or tube was attached to the system and the figure is meant to serve only as an illustration where the servo-control is operational. The chamber pressure was monitored and displayed below the $O_2$ tracing using an ionization gauge. The small change in chamber pressure over this period caused a change of less than 0.5% in the oxygen signal. Since the ionization gauge is also affected by the changing gas concentration (decreased $O_2$ and increased $CO_2$) in the chamber, an evaluation of the acccuracy should be based on the output signal for each gas from the mass spectrometer. If the servo-control on the leak is disabled, the leak clogs up very rapidly as indicated in FIG. 4. Here, the system was exposed to a short burst of expiratory gas (approx, 1 sec.) and the chamber pressure changed several fold. The change in oxygen signal in this case is mainly due to pressure change in the ionizer. Even when exposed to room air only, the leak would clog up very rapidly from dust particles in the air.

Thus, in operation the mass spectrometer of this invention receives gas through chamber 8 and the amount of gas introduced into the ionization chamber 9 is controlled by a servo-control system which includes a piezoelectric crystal (indicated as a bimorph crystal in FIGS. 1 and 2) that flexes due to application of an electric potential. The electric potential is generated by a sensing plate 36 in the path of the ion beam with the electrical output signal from plate 36 being coupled to control amplifier, or signal processing means, 18. As shown in FIG. 1, the output to the piezoelectric crystal is preferably a pulse-width modulated signal, such as indicated at 20. Such a signal is conventionally formed and not detailed herein, but rather only indicated. In like manner, the typical operation of a mass spectrometer, as well as other details have been left out of this description for simplicity.

In addition to the reference set out hereinabove, the following may be consulted for further systems and/or component details: Abrahamsson, S., "The Use of Computers In Low Resolution Mass Spectrometry," SCIENCE TOOLS, Volume 14, pages 29–34, 1967; Beckman Instruments, Inc., "Metabolic Activity Gas Analyzer", Technical Report; Brubaker, W. M., "A Study of the Introduction of into the Region of Strong Fields Within A quadrupole Mass Spectrometer," Final Report NASA-CR-91801, August, 1965–October, 1967; Brubaker, W. M. "Theoretical and Experimental Comparisons of Quadrupole Mass Analyzers with Round and Hyperbolic Field-forming Surfaces," Invited Paper, International Conference on Mass Spectrometry, September, 1969, Kyoto, Japan, Dardik, H., and Laufman, H., "On-line In Vivo Measurements of Partial Pressure of Oxygen and Carbon Dioxide of Blood, Tissue, and Respired Air by Mass Spectrometry," SURG. GYN. & OBSTET., Volume 131, pages 1157–1160, 1970; Dawson, P. H. Hedman, J. S., and Whetten, N. R., "A Simple Mass Spectrometer," THE REVIEW OF SCIENTIFIC INSTRUMENTS, Volume 40(11), pages 1444–1450, November 1969, Jones, W. B., Finchum, R. N., Russell R. O. Jr., and Reeves, T. J., "Transient Cardiac Output Response To Multiple Levels of Supine Exercise," J. APPL. PHYSIOL, Volume 28, pages 183–189, 1970; Jones, W. B., Reeves, T. J., "Total Cardiac Output Response During Four Minutes of Exercise," AMER, HEART J., Volume 76, pages 209–216, 1968; and Kim, T. S., Rahn, H. and Farhi, L. "Estimation of True Venous and Arterial $P_{CO_2}$ by Gas Analysis of a Single Breath," J. APPL. PHYSIOL, Volume 21, pages 1338–1344, 1966.

Although the above description relates to the use of a method and inlet control system for controlling a gas flow sample to a mass spectrometer and a novel mass spectrometer, it will be understood that this invention is not so limited and may be used in controlling pressures in vacuum chambers such as, for example, those used in a sputtering system. Accordingly, it will now be appreciated that this invention relates to an inlet control system for an evacuated chamber in which said system comprises an inlet passage opening into the interior of said evacuated chamber to introduce gas samples therethrough, valve means at said inlet passage for controlling the effective opening through said passage, and valve control means for controlling the positioning of said valve means thereby to control the introduction of gas samples to said evacuated chamber. The evacuated chamber into which the gas samples are introduced may be constructed with a relatively small volume, i.e., less than about 2 cc total volume. The valve means may be made to be responsive to the pressure within the evacuated chamber thereby controlling the opening through the inlet passage to maintain a substantially constant pressure within the evacuated chamber. Further, this invention relates to a method for controlling gas flow sample to an evacuated chamber comprising providing an inlet for gas sample into the evacuated chamber, sensing or monitoring the pressure within the evacuated chamber and developing or generating an electrical signal indicative thereof, and utilizing the generated or developed signal to control the flow of gas sample through the inlet to maintain a substantially constant pressure within the evacuated chamber. The method also includes providing a respiratory valve from which gas sample is taken through said inlet so that both inspired and expired gas samples may be tested.

From the foregoing, it can be seen that this invention provides a new and novel method and inlet system for an evacuated chamber, as well as a new and novel mass spectrometer.

What is claimed is:

1. A method for maintaining constant gas pressure in an evacuated chamber of minute total volume, said method comprising the steps of:

injecting gas through an inlet of small diameter, directing a beam of ions from an ion source through the injected stream of gas at a point just below the inlet in the chamber, detecting the amount of ions at a point opposing the ion source and near the inlet, the amount of ions detected being proportional to the pressure of the chamber, generating an electrical signal in response to the sensed pressure, the strength of the electrical signal varying with the amount of ions detected, and occluding the inlet at which the gas is injected in response to the strength of the electrical signal.

2. The method of claim 1 in which the occluding step further comprises:

orienting a diamond tipped needle above the inlet on the outer surface of the chamber, and positioning the needle tip in the inlet at a variety of positions in response to the strength of the electrical signal.

3. The method of claim 1 further comprising the step of:

closing the inlet in the event of power failure for the electrical signal thereby maintaining the pressure in the chamber constant.

4. A valve for maintaining constant pressure in a small evacuated chamber, said valve comprising:

an inlet in said chamber, means for selectively injecting gas through said inlet, means in said chamber for directing a beam of ions through the injected stream of gas at a point just below the inlet in the chamber, means in said chamber opposite said directing means for detecting the amount of ions at a point near said inlet, said detected ions being proportional to said pressure in said chamber, and means responsive to detected ions for regulating the flow of gas through said inlet.

5. The valve of claim 4 in which said regulating means comprises:

means cooperative with said detecting means for generating an electrical signal, the strength of said electrical signal varying with the amount of the ions detected, and means receptive of said signal for occluding said inlet.

6. The valve of claim 5 in which said occluding means comprises:

a diamond tipped needle oriented above said inlet on the outersurface of said chamber, and means responsive to said electrical signal for positioning the tapered tip of the needle at a plurality of locations in said inlet.

7. A valve for maintaining constant pressure in a small evacuated chamber, said valve comprising:

a tapered inlet in said chamber, means for injecting gas in said chamber through said inlet, means in said chamber for monitoring the pressure in said chamber, a needle having a tapered diamond point positioned above said inlet, the taper of said needle point corresponding in a mating relationship with the taper of said inlet, and means cooperative with said monitoring means for selectively positioning, said diamond point in said inlet thereby regulating the flow of said gas into said chamber.

8. The valve of claim 7 in which said positioning means firmly maintains said needle point in said tapered inlet in the event of inoperation of said valve thereby maintaining constant pressure in said chamber over a period of time.

* * * * *